(12) United States Patent
Ozsoylu et al.

(10) Patent No.: US 8,327,733 B2
(45) Date of Patent: Dec. 11, 2012

(54) PIVOTING LOCKING DEVICE FOR AN ADJUSTABLE STEERING COLUMN

(75) Inventors: Suat A. Ozsoylu, Rochester Hills, MI (US); Karen A. Boswell, Freeland, MI (US); Michael P. Anspaugh, Bay City, MI (US); Michael R. Pyrett, Davison, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 889 days.

(21) Appl. No.: 12/367,819

(22) Filed: Feb. 9, 2009

(65) Prior Publication Data

US 2009/0229400 A1 Sep. 17, 2009

Related U.S. Application Data

(60) Provisional application No. 61/068,913, filed on Mar. 11, 2008.

(51) Int. Cl.
*B62D 1/184* (2006.01)
*B62D 1/187* (2006.01)
*B62D 1/189* (2006.01)

(52) U.S. Cl. .......................................... 74/493; 280/775

(58) Field of Classification Search ..................... 74/493, 74/496, 497; 280/777, 775
See application file for complete search history.

(56) References Cited

U.S. PATENT DOCUMENTS

| | | | |
|---|---|---|---|
| 5,531,317 A | 7/1996 | Tomaru | |
| 5,570,610 A | 11/1996 | Cymbal | |
| 5,722,299 A | 3/1998 | Yamamoto et al. | |
| 5,823,062 A | 10/1998 | Snell et al. | |
| 6,139,057 A | 10/2000 | Olgren et al. | |
| 6,419,269 B1 | 7/2002 | Manwaring et al. | |
| 6,616,185 B2 | 9/2003 | Manwaring et al. | |
| 6,659,504 B2 | 12/2003 | Riefe et al. | |
| 2002/0171235 A1 | 11/2002 | Riefe et al. | |
| 2003/0057694 A1 | 3/2003 | Manwaring et al. | |

(Continued)

FOREIGN PATENT DOCUMENTS

EP 1093990 A2 4/2001

OTHER PUBLICATIONS

Extended European Search Report for related European Patent Application No. EP09154465.0 issued on Sep. 20, 2012, 6 pages.

*Primary Examiner* — William C Joyce
*Assistant Examiner* — Terence Boes
(74) *Attorney, Agent, or Firm* — Cantor Colburn LLP

(57) ABSTRACT

A steering column assembly includes a mounting bracket and a column jacket moveable relative to the mounting bracket to adjust a position of the column jacket. A rake plate is pivotably coupled to the mounting bracket and defines a rake slot having rake slot teeth. A telescope plate is pivotably coupled to the column jacket and defines a telescope slot having telescope slot teeth. A rake lock having rake lock teeth is disposed within the rake slot and a telescope lock having telescope lock teeth is disposed within the telescope slot. The rake plate and the telescope plate pivot as the rake lock and the telescope lock move into interlocking toothed engagement to avoid peak-to-peak contact between the lock teeth and the slot teeth, thereby permitting full meshing engagement between the lock teeth and the slot teeth.

23 Claims, 3 Drawing Sheets

U.S. PATENT DOCUMENTS

| | | |
|---|---|---|
| 2003/0193180 A1 | 10/2003 | Riefe et al. |
| 2006/0090586 A1 | 5/2006 | Lee |
| 2006/0207379 A1 | 9/2006 | Riefe et al. |
| 2007/0013180 A1 | 1/2007 | Stuedemann et al. |
| 2008/0178702 A1 | 7/2008 | Lutz |
| 2008/0196536 A1 | 8/2008 | Manwaring et al. |
| 2008/0231030 A1 | 9/2008 | Menjak et al. |
| 2009/0229399 A1* | 9/2009 | Ozsoylu et al. .................. 74/493 |
| 2009/0267336 A1* | 10/2009 | Streng et al. .................. 280/775 |
| 2009/0282945 A1* | 11/2009 | Streng et al. .................... 74/493 |

* cited by examiner

PIVOTING LOCKING DEVICE FOR AN ADJUSTABLE STEERING COLUMN

CROSS REFERENCE TO RELATED APPLICATION

This application claims the benefit of U.S. Provisional patent application Ser. No. 61/068,913, filed Mar. 11, 2008, the disclosure of which is hereby incorporated by reference.

BACKGROUND OF THE INVENTION

1. Field of the Invention

The subject invention generally relates to a steering column assembly, and more specifically to an adjustable steering column assembly.

2. Description of the Prior Art

Steering column assemblies are often adjustable in a longitudinal direction, i.e., a telescopic adjustment, and/or adjustable in a vertical direction, i.e., a rake or pivot adjustment. Typically, the adjustable steering column assemblies include a mounting bracket configured for attachment to the vehicle, and a column jacket coupled to the mounting bracket. The column jacket extends along a longitudinal axis, and is moveable relative to the mounting bracket in at least one of a vertical direction, to adjust the rake adjustment, and a longitudinal direction, to adjust the telescopic adjustment.

The steering column assemblies may utilize one or both of a frictional clamp and an interlocking toothed mechanism to secure the relative position of the column jacket relative to the mounting bracket. The frictional clamp compresses the mounting bracket against a compression bracket, attached to the column jacket, to generate a frictional force to secure the position of the column jacket. However, in the event of an impact event, such as a vehicular collision, the frictional force may be insufficient to secure the position of the column jacket relative to the mounting bracket. Accordingly, many steering column assemblies alternatively utilize, or in combination with the frictional clamp, an interlocking toothed lock mechanism to mechanically lock the position of the column jacket relative to the mounting bracket.

Typically, such interlocking toothed lock mechanisms include one of the mounting bracket and the compression bracket defining a rake slot and a telescope slot respectively. The rake slot and/or the telescope slot define a plurality of slot teeth. A shaft extends through the rake slot and/or the telescope slot. A lock, i.e., a pawl, is disposed within the rake slot and/or the telescope slot, and includes a plurality of lock teeth. A lever is coupled to the shaft to rotate the shaft. Rotation of the shaft moves the lock into and out of a locked position, wherein the lock teeth are disposed in mechanical interlocking engagement with the slot teeth, and an unlocked position, wherein the lock teeth are disengaged from the slot teeth. The interlocking mechanical engagement between the lock teeth and the slot teeth prevent slippage of the column jacket relative to the mounting bracket, even in response to a collision event.

When moving the lock into the locked position from the unlocked position, the lock teeth often engage the slot teeth in peak to peak engagement. When this happens, the column jacket must move relative to the mounting bracket to permit a complete or full meshing engagement between the lock teeth and the slot teeth. If the steering column assembly includes a frictional clamp, the frictional force generated and applied between the mounting bracket and the compression bracket at the time of the peak to peak engagement between the lock teeth and the slot teeth may be sufficiently high to prevent the movement of the column jacket relative to the mounting bracket to obtain the full meshing engagement. Failure to achieve the full meshing engagement provides a false sense that the steering column assembly has fully engaged both the frictional clamping mechanism and the interlocking toothed lock mechanism.

SUMMARY OF THE INVENTION AND ADVANTAGES

The subject invention provides a steering column assembly for a vehicle. The steering column assembly comprises a mounting bracket. The mounting bracket is configured for attachment to the vehicle. A column jacket extends along a longitudinal axis. The column jacket is moveable relative to the mounting bracket in at least one of a vertical direction and a longitudinal direction. Movement of the column jacket relative to the mounting bracket provides for adjustment in at least one of a vertical position and a longitudinal position of the column jacket. A plate is coupled to at least one of the mounting bracket and the column jacket. The plate defines at least one of a rake slot and a telescope slot. The at least one of the rake slot and the telescope slot includes a plurality of slot teeth. A lock is disposed within the at least one of the rake slot and the telescope slot. The lock includes a plurality of lock teeth. The lock is moveable between a locked position and an unlocked position. When in the locked position, the lock teeth are disposed in interlocking engagement with the slot teeth to prevent movement of the column jacket relative to the mounting bracket. When in the unlocked position, the lock teeth are disengaged from the slot teeth to permit movement of the column jacket relative to the mounting bracket. A pivotal connection interconnects the plate and at least one of the mounting bracket and the column jacket. The pivotal connection permits pivotal movement of the plate relative to the lock to align the slot teeth with the lock teeth in full meshing engagement in response to the lock moving into the locked position.

Accordingly, the steering column assembly of the subject invention permits the slot teeth to pivot relative to the lock teeth. The pivotal movement of the slot teeth relative to the lock teeth permits the slot teeth to move relative to the lock teeth in the event of peak to peak engagement between the lock teeth and the slot teeth when moving the lock into the locked position, thereby ensuring complete and full meshing engagement between the lock teeth and the slot teeth.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
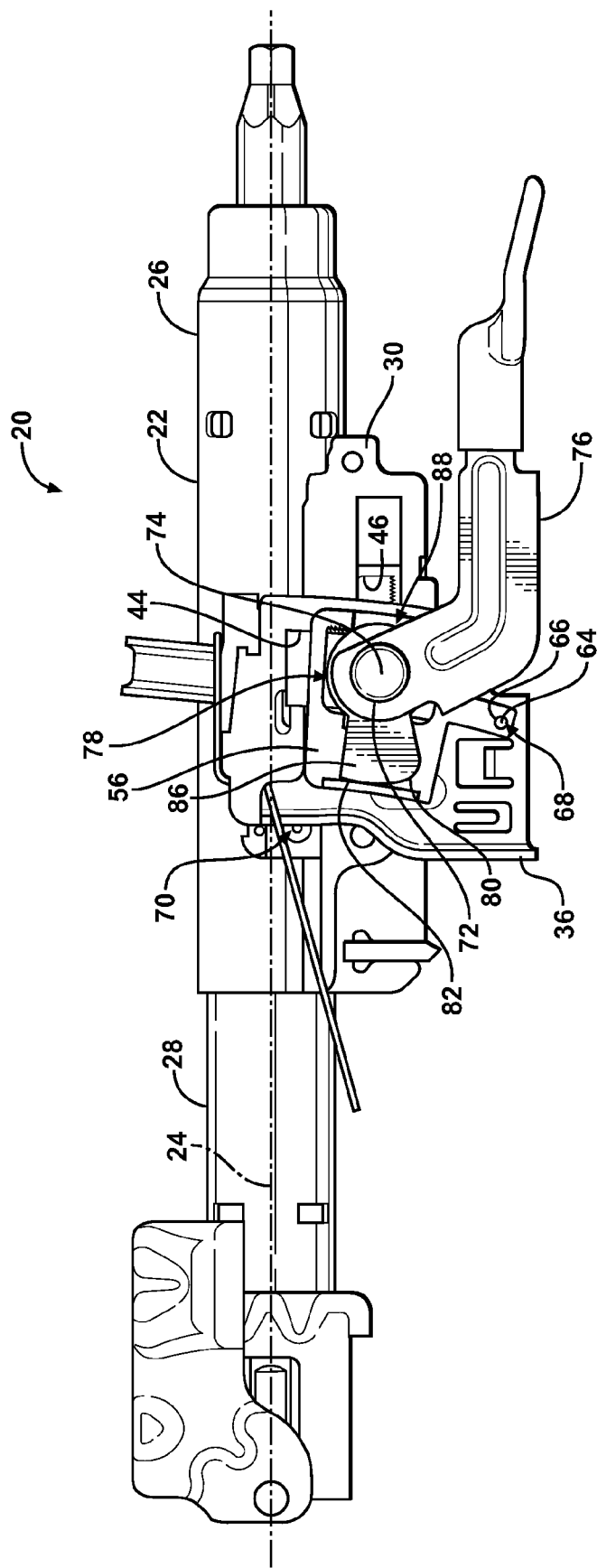
FIG. 1 is a side plan view of a steering column assembly.
Figure 2:
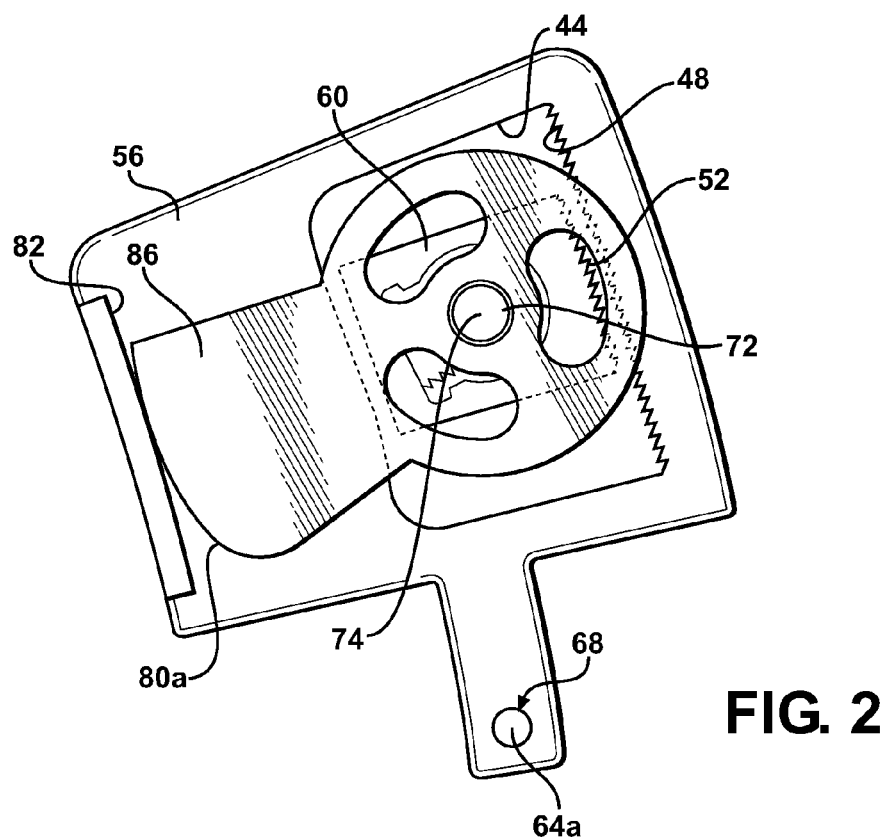
FIG. 2 is a perspective view of the steering column assembly.

Referring to the Figures, wherein like numerals indicate corresponding parts throughout the several views, a steering column assembly is shown generally at 20. Referring to FIGS. 1 and 2, the steering column assembly 20 is for a vehicle, and is adjustable in at least one of a tilt, i.e., rake, direction and a telescopic, i.e., longitudinal direction. The steering column assembly 20 shown and described herein is adjustable in both the rake direction and the longitudinal direction. However, it should be appreciated that the scope of the subject invention only requires that the steering column assembly 20 be adjustable in one of the rake direction and the longitudinal direction.

The steering column assembly 20 includes a column jacket 22 that extends along a longitudinal axis 24. Typically, the column jacket 22 includes an upper jacket 26 and a lower jacket 28. The upper jacket 26 is telescopically engaged with and moveable relative to the lower jacket 28. A steering wheel (not shown) is attached to the upper jacket 26. It should be appreciated that the longitudinal adjustment of the column jacket 22 adjusts the longitudinal position of the steering wheel, and is achieved through the telescopic movement between the upper jacket 26 and the lower jacket 28.

As shown, the column jacket 22 includes a compression bracket 30. The compression bracket 30 is fixedly attached to the column jacket 22. The compression bracket 30 includes a first sidewall 32 and a second sidewall 34 disposed on opposing sides of the column jacket 22, and laterally offset from the column jacket 22. The first sidewall 32 and the second sidewall 34 are generally parallel to each other and extend along the longitudinal axis 24. However, it should be appreciated that the compression bracket 30 may be configured to include some other shape and/or configuration to meet the specific design considerations of the vehicle, and may vary from the shape and configuration shown and described herein.

A mounting bracket 36 is coupled to the column jacket 22. The mounting bracket 36 is configured for attachment to the vehicle, and interconnects the column jacket 22 with the vehicle. The mounting bracket 36 may be configured to suit the specific design restraints and considerations of the vehicle, and attached to the vehicle in any suitable manner. Typically, a pair of fasteners, such as bolts, connect the mounting bracket 36 to the vehicle. However, it should be appreciated that the scope of the claims is not dependent upon the manner in which the mounting bracket 36 is configured and attached to the vehicle.

As shown, the mounting bracket 36 includes a bottom wall 38. A first side flange 40 and a second side flange 42 extend generally upwardly from the bottom wall 38. The first side flange 40 and the second side flange 42 are generally parallel to and in spaced relationship relative to each other. The first side flange 40 and the second side flange 42 extend generally along the longitudinal axis 24. The first sidewall 32 and the second sidewall 34 of the compression bracket 30 are disposed between and adjacent to the first side flange 40 and the second side flange 42 respectively, i.e., the first sidewall 32 is adjacent to the first side flange 40 and the second sidewall 34 is adjacent to the second side flange 42.

The column jacket 22 is moveable relative to the mounting bracket 36 in at least one of a vertical direction and a longitudinal direction. Movement in the vertical direction, such as pivotal movement of the column jacket 22 relative to the mounting bracket 36, adjusts a vertical position of the column jacket 22 and thereby the vertical position of the steering wheel. Movement in the longitudinal direction, such as through telescopic movement between the upper jacket 26 and the lower jacket 28 relative to the mounting bracket 36, adjusts a longitudinal position of the column jacket 22 and thereby the longitudinal position of the steering wheel.

A plate 56, 58 is coupled to at least one of the mounting bracket 36 and the column jacket 22. The plate 56, 58 defines at least one of a rake slot 44 and a telescope slot 46. The at least one of the rake slot 44 and the telescope slot 46 includes a plurality of slot teeth 48, 50. As shown and described herein, the plate 56, 58 includes a rake plate 56 coupled to the mounting bracket 36, and further includes a telescope plate 58 coupled to the column jacket 22. The rake plate 56 defines the rake slot 44, with the rake slot 44 including rake slot teeth 48. The telescope plate 58 defines the telescope slot 46, with the telescope slot 46 including telescope slot teeth 50. Preferably, and as shown herein, the telescope plate 58 is coupled to the compression bracket 30. However, it should be appreciated that the telescope plate 58 may be coupled to some other component of the column jacket 22.

A lock 60, 62 is disposed within the at least one of the rake slot 44 and the telescope slot 46. The lock 60, 62 includes a plurality of lock teeth 52, 54. The lock 60, 62 is moveable between a locked position and an unlocked position. When in the locked position, the lock teeth 52, 54 are disposed in interlocking meshing engagement with the slot teeth 48, 50 to prevent movement of the column jacket 22 relative to the mounting bracket 36. When in the unlocked position, the lock teeth 52, 54 are disengaged from the slot teeth 48, 50 thereby permitting movement of the column jacket 22 relative to the mounting bracket 36.

As shown and described herein, the lock 60, 62 includes a rake lock 60 disposed within the rake slot 44, and a telescope lock 62 disposed within the telescope slot 46. The rake lock 60 includes rake lock teeth 52 for meshing with the rake slot teeth 48. The telescope lock 62 includes telescope lock teeth 54 for meshing with the telescope slot teeth 50. However, it should be appreciated that the rake lock 60 and the telescope lock 62 may be integrally formed together, and include both the rake lock teeth 52 disposed within the rake slot 44, and the telescope lock teeth 54 disposed within the telescope slot 46.

A pivotal connection 68, 70 interconnects the plate 56, 58 and at least one of the mounting bracket 36 and the column jacket 22. The pivotal connection 68, 70 permits pivotal movement of the plate 56, 58 relative to the lock 60, 62. The pivotal movement of the plate 56, 58 relative to the lock 60, 62 aligns the slot teeth 48, 50 with the lock teeth 52, 54 in full meshing engagement in response to the lock 60, 62 moving into the locked position, thereby preventing peak-to-peak contact between the lock teeth 52, 54 and the slot teeth 48, 50.

The pivotal connection 68, 70 defines a pivot axis 64A. 64B, with the plate 56, 58 pivotal about the pivot axis 64A. 64B. The pivot axis 64A. 64B is generally transverse, i.e., perpendicular, to the longitudinal axis 24. When moving between the locked position and the unlocked position, the lock 60, 62 moves along a path that is generally perpendicular to the direction of adjustment. The pivot axis 64A. 64B is laterally offset from the path, so that the pivotal movement of the plate 56, 58 moves the slot teeth 48, 50 generally perpendicular to the path to align the slot teeth 48, 50 with the lock teeth 52, 54.

The pivotal connection 68, 70 may be configured in any suitable manner that permits free and unobstructed pivotal movement between the plate 56, 58 and one of the column jacket 22 and the mounting bracket 36. The pivotal connection 68, 70 may include a pin 66 extending through and interconnecting the plate 56, 58 and the at least one of the column jacket 22 and the mounting bracket 36. The center of the pin 66 defines the pivot axis 64A. 64B. However, it should be appreciated that the pivotal connection 68, 70 between the plate 56, 58 and the at least one of the column jacket 22 and the mounting bracket 36 may include some other manner of connection other than shown and described herein.

As shown and described herein, the pivotal connection 68, 70 includes a rake pivotal connection 68 interconnecting the rake plate 56 and the mounting bracket 36, and a telescope pivotal connection 70 interconnecting the telescope plate 58 and the column jacket 22. More specifically, the telescope pivotal connection 70 interconnects the telescope plate 58 and the compression bracket 30. The rake pivotal connection 68 permits pivotal movement between the rake plate 56 and the mounting bracket 36. The telescope pivotal connection 70 permits pivotal movement between the telescope plate 58 and the column jacket 22, and more specifically between the telescope plate 58 and the compression bracket 30.

A shaft 72, i.e., a rake bolt, extends through the at least one of the rake slot 44 and the telescope slot 46. The shaft 72 is rotatable about a shaft axis 74. The shaft axis 74 is generally transverse or perpendicular to the longitudinal axis 24. The shaft 72 is coupled to and extends through the lock 60, 62. As shown, the shaft 72 is coupled to and extends through both the rake lock 60 and the telescope lock 62. A handle 76 is attached to the shaft 72 for rotating the shaft 72.

A locking mechanism 78 is coupled to the shaft 72 and the lock 60, 62. The locking mechanism 78 moves the lock 60, 62 between the locked position and the unlocked position. Accordingly, rotation of the shaft 72 via the handle 76 actuates the locking mechanism 78, which in turn moves the lock 60, 62 between the locked position and the unlocked position. As such, it should be appreciated that rotation of the shaft 72 actuates the locking mechanism 78 to simultaneously move both the rake lock 60 and the telescope lock 62 between their respective locked and unlocked positions.

Figure 4:
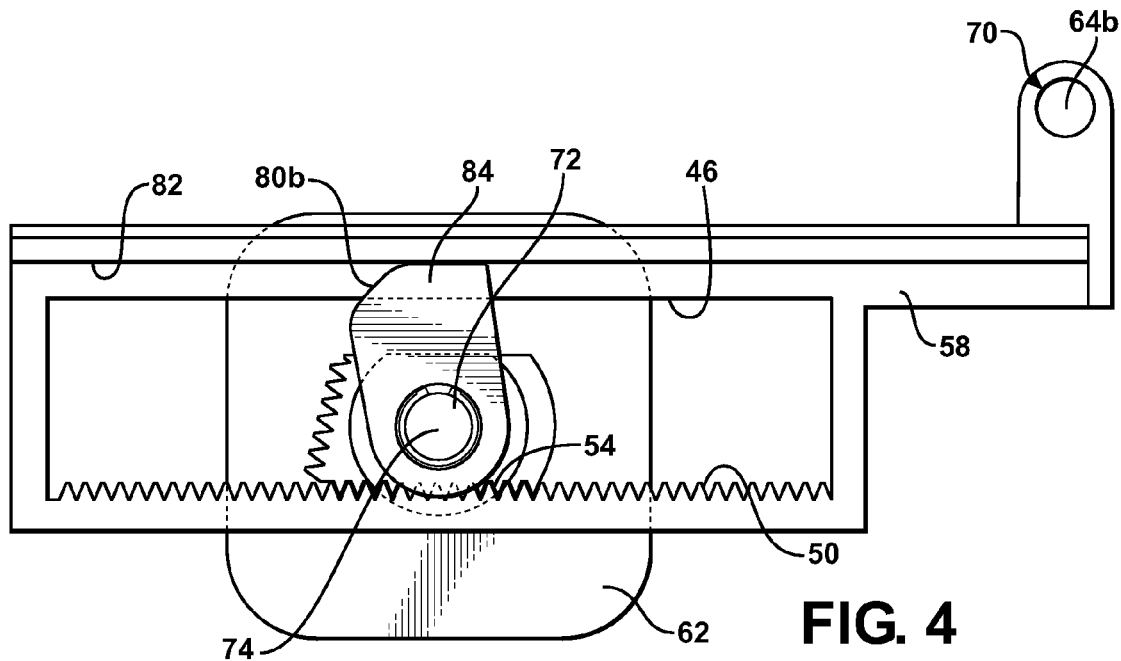
FIG. 4 is a side plan view of the rake plate and the rake cam utilized in the steering column assembly in accordance with the subject invention and shown in an unlocked position.
Figure 3:
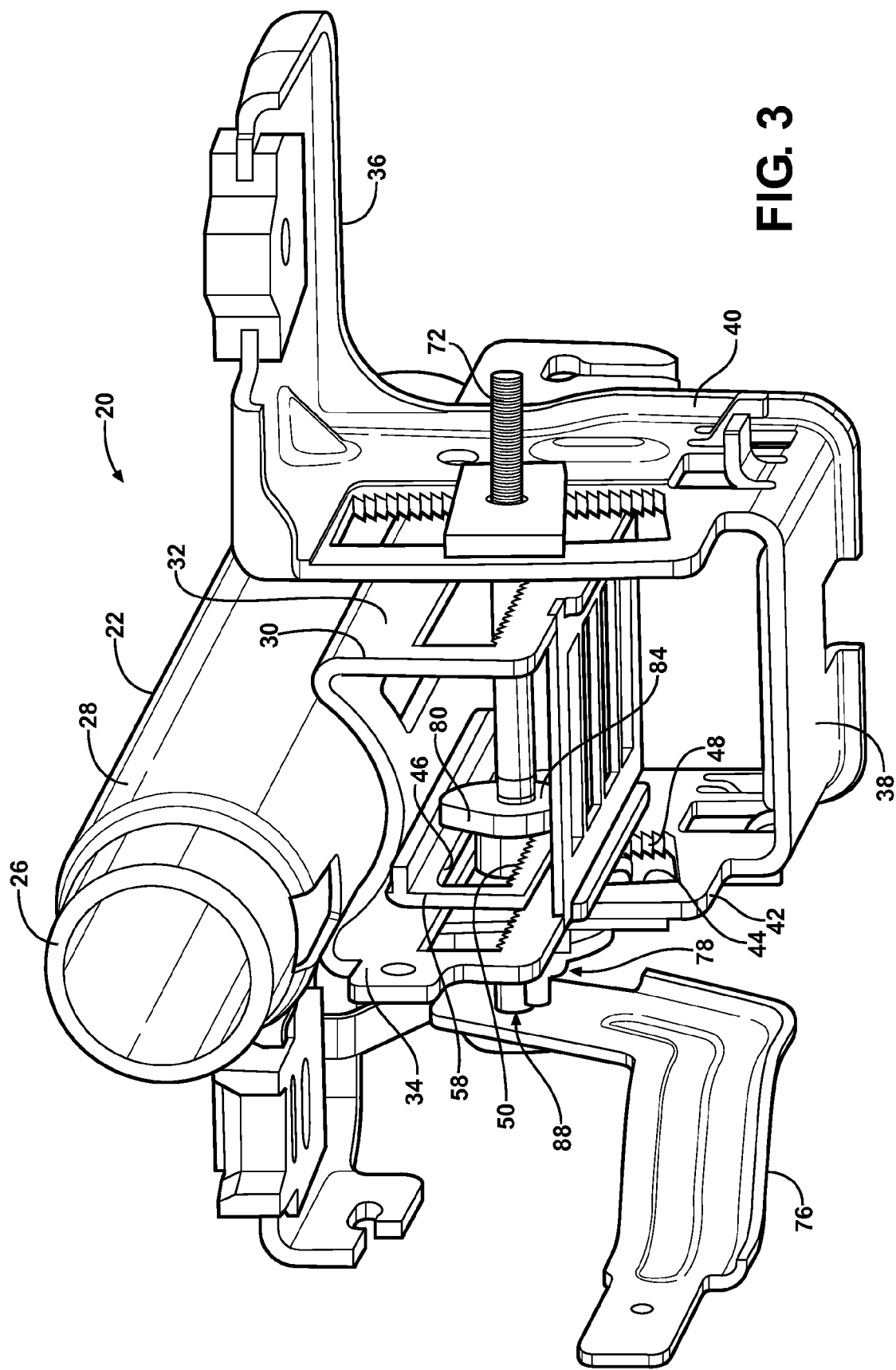
FIG. 3 is a side plan view of a rake plate and a rake cam utilized in the steering column assembly in accordance with the subject invention and shown in a locked position.

Referring also to FIG. 4, the locking mechanism 78 includes a cam 84, 86 coupled to and rotatable with the shaft 72. The cam 84, 86 defines a cam profile, i.e., a camming surface, generally at 80. In an exemplary embodiment, the cam profile 80 may be a cam profile 80A defined in the cam 86, and a cam profile 80B defined on cam 84. The plate 56, 58 includes a ledge 82, i.e., a cam follower, engaging the cam 84, 86. More specifically, the cam profile 80A, 80B engages the ledge 82 in abutting engagement. The slot teeth 48, 50 and the ledge 82 are disposed opposite each other on opposing sides of the shaft 72. The cam profile 80A, 80B biases the shaft 72, and thereby the lock 60, 62 coupled to the shaft 72, away from the ledge 82 in response to rotation of the shaft 72 in a first direction to move the lock 60, 62 into the locked position. It should be appreciated that biasing the lock 60, 62 away from the ledge 82 moves the lock teeth 52, 54 toward and into engagement with the slot teeth 48, 50. The cam profile 80A, 80B releases the bias against the shaft 72 in response to rotation of the shaft 72 in a second direction, opposite to the first direction, to move the lock 60, 62 into the unlocked position. It should be appreciated that releasing the bias between the ledge 82 and the lock 60, 62 moves the lock teeth 52, 54 away from and out of engagement with the slot teeth 48, 50.

The first direction may include a clockwise direction and the second direction may include a counterclockwise direction. However, it should be appreciated that the first direction and the second direction may be reversed, with the first direction including the counterclockwise direction and the second direction including the clockwise direction.

As shown and described herein, the cam 84, 86 includes a telescope cam 84 engaging the ledge 82 of the telescope plate 58 and a rake cam 86 engaging the ledge 82 of the rake plate 56. Accordingly, it should be appreciated that the rotation of the shaft 72 operates both the rake cam 86 and the telescope cam 84, to move both the rake lock 60 and the telescope lock 62 between their respective locked and unlocked positions.

Referring back to FIGS. 1 and 2, the steering column assembly 20 may include a compression camming mechanism 88. The compression camming mechanism 88 compresses the mounting bracket 36 against the compression bracket 30 to create a compressive frictional force between the mounting bracket 36 and the compression bracket 30. The compressive frictional force resists movement of the column jacket 22 relative to the mounting bracket 36. More specifically, the compression camming mechanism 88 compresses the first side flange 40 and the second side flange 42 against the first sidewall 32 and the second sidewall 34 respectively, to secure the position of the column jacket 22 relative to the mounting bracket 36. There are many known types and configurations of the compression camming mechanism 88 known that are suitable for use with the steering column assembly 20 of the subject invention. Accordingly, it should be appreciated that the scope of the invention is not limited to the specific type, configuration and/or components of the compression camming mechanism 88. Typically, the compression camming mechanism 88 is coupled to and actuated by rotation of the shaft 72, and operates a cam that biases the first side flange 40 and the second side flange 42 of the mounting bracket 36 inward against eh first sidewall 32 and the second sidewall 34 of the compression bracket 30.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly comprising:
    a mounting bracket;
    a column jacket extending along a longitudinal axis and moveable relative to said mounting bracket in at least one of a vertical direction and a longitudinal direction for adjusting at least one of a vertical position and a longitudinal position of said column jacket;
    a compression bracket fixedly attached to said column jacket;
    a plate coupled to at least one of said mounting bracket and said column jacket, said plate defining one of at least one rake slot, at least one telescope slot, or both, each rake slot and/or telescope slot defined by the plate including a plurality of slot teeth;
    a lock including a plurality of lock teeth and disposed within said at least one of said rake slot and said telescope slot with said lock moveable between a locked position and an unlocked position;
    said plate pivotally mounted to at least one of said mounting bracket and said column jacket such that said plate pivots relative to said lock to align said slot teeth with said lock teeth in full meshing engagement in response to said lock moving into said locked position.

2. A steering column assembly for a vehicle, said assembly comprising:
    a mounting bracket;
    a column jacket extending along a longitudinal axis and moveable relative to said mounting bracket in at least one of a vertical direction and a longitudinal direction for adjusting at least one of a vertical position and a longitudinal position of said column jacket;

a plate coupled to at least one of said mounting bracket and said column jacket and defining at least one of a rake slot and a telescope slot with said at least one of said rake slot and said telescope slot including a plurality of slot teeth;

a lock including a plurality of lock teeth and disposed within said at least one of said rake slot and said telescope slot with said lock moveable between a locked position wherein said lock teeth are disposed in interlocking engagement with said slot teeth to prevent movement of said column jacket relative to said mounting bracket and an unlocked position wherein said lock teeth are disengaged from said slot teeth to permit movement of said column jacket relative to said mounting bracket;

a pivotal connection interconnecting said plate and at least one of said mounting bracket and said column jacket to permit pivotal movement of said plate relative to said lock to align said slot teeth with said lock teeth in full meshing engagement in response to said lock moving into said locked position.

3. An assembly as set forth in claim 2 wherein said pivotal connection defines a pivot axis with said plate pivotal about said pivot axis.

4. An assembly as set forth in claim 3 wherein said lock moves along a path and said pivot axis is laterally offset from said path.

5. An assembly as set forth in claim 4 wherein said pivotal connection includes a pin defining said pivot axis and extending through and interconnecting said plate and at least one of said column jacket and said mounting bracket.

6. An assembly as set forth in claim 2 further comprising a locking mechanism coupled to said lock for moving said lock between said locked position and said unlocked position.

7. An assembly as set forth in claim 6 further comprising a shaft coupled to said locking mechanism and extending through said at least one of said rake slot and said telescope slot with said shaft rotatable about a shaft axis transverse to said longitudinal axis for actuating said locking mechanism.

8. An assembly as set forth in claim 7 further comprising a handle attached to said shaft for rotating said shaft.

9. An assembly as set forth in claim 7 wherein said shaft is coupled to and extends through said lock.

10. An assembly as set forth in claim 9 wherein said locking mechanism includes a cam coupled to and rotatable with said shaft.

11. An assembly as set forth in claim 10 wherein said plate includes a ledge engaging said cam.

12. An assembly as set forth in claim 11 wherein said cam defines a cam profile biasing said shaft away from said ledge in response to rotation of said shaft in a first direction to move said lock into said locked position.

13. An assembly as set forth in claim 12 wherein said cam profile releases said bias against said shaft in response to rotation of said shaft in a second direction opposite to said first direction to move said lock into said unlocked position.

14. An assembly as set forth in claim 11 wherein said slot teeth and said ledge are disposed opposite each other on opposing sides of said shaft.

15. An assembly as set forth in claim 6 wherein said plate includes a rake plate coupled to said mounting bracket.

16. An assembly as set forth in claim 15 wherein said cam includes a rake cam engaging a ledge of said rake plate.

17. An assembly as set forth in claim 16 wherein said pivotal connection includes a rake pivotal connection interconnecting said rake plate and said mounting bracket.

18. An assembly as set forth in claim 17 wherein said plate includes a telescope plate coupled to said column jacket.

19. An assembly as set forth in claim 18 wherein said cam includes a telescope cam engaging a ledge of said telescope plate.

20. An assembly as set forth in claim 19 wherein said pivotal connection includes a telescope pivotal connection interconnecting said telescope plate and said column jacket.

21. An assembly as set forth in claim 20 wherein said lock includes a rake lock disposed within said rake slot and a telescope lock disposed within said telescope slot.

22. An assembly as set forth in claim 21 wherein said column jacket includes a compression bracket and said telescope plate is coupled to said compression bracket.

23. An assembly as set forth in claim 22 further comprising a compression camming mechanism for compressing said mounting bracket against said compression bracket to create a compressive frictional force between said mounting bracket and said compression bracket to resist movement of said column jacket relative to said mounting bracket.

* * * * *